(12) United States Patent
Edwards et al.

(10) Patent No.: US 11,688,092 B2
(45) Date of Patent: Jun. 27, 2023

(54) SYSTEMS AND METHODS FOR IDENTIFYING PACKAGE PROPERTIES IN AN AUTOMATED INDUSTRIAL ROBOTICS SYSTEM

(71) Applicant: Plus One Robotics, Inc., San Antonio, TX (US)

(72) Inventors: Shaun Edwards, San Antion, TX (US); Erik Nieves, San Antonio, TX (US); Paul Hvass, San Antonio, TX (US); Joshua Justin Curtis, San Antonio, TX (US)

(73) Assignee: Plus One Robotics, Inc., San Antonio, TX (US)

( * ) Notice: Subject to any disclaimer, the term of this patent is extended or adjusted under 35 U.S.C. 154(b) by 299 days.

(21) Appl. No.: 17/180,970

(22) Filed: Feb. 22, 2021

(65) Prior Publication Data
US 2021/0174039 A1 Jun. 10, 2021

Related U.S. Application Data

(63) Continuation of application No. 16/846,331, filed on Apr. 11, 2020, now Pat. No. 10,949,635.
(Continued)

(51) Int. Cl.
*G06T 7/60* (2017.01)
*G05B 19/042* (2006.01)
(Continued)

(52) U.S. Cl.
CPC ............... *G06T 7/60* (2013.01); *B65G 1/137* (2013.01); *B65G 43/08* (2013.01); *G05B 19/042* (2013.01);
(Continued)

(58) Field of Classification Search
CPC .. G06T 7/60; G06K 7/10861; G06K 7/10445; G06K 7/1404; G06K 7/1443;
(Continued)

(56) References Cited

U.S. PATENT DOCUMENTS 5,323,470 A 6/1994 Kara et al.
8,489,232 B2 * 7/2013 Mishra ................... G06Q 10/08
235/384
(Continued)

FOREIGN PATENT DOCUMENTS

DE 102017114081 A1 12/2018
WO 9949411 A1 9/1999
WO 2017182974 A1 10/2017

*Primary Examiner* — Thomas Randazzo
(74) *Attorney, Agent, or Firm* — Outlier Patent Attorneys, PLLC

(57) ABSTRACT

A package scanning conveyance system that integrates a first two-dimensional image with at least a second two-dimensional image or a three-dimensional point clouds to calculate or estimate a package's physical properties, and/or determine if there are two or more packages in a pile. The captured imaging data is transformed by the inventive system to provide real-time feedback to a human operator to enable the operator to maintain an understanding of the system's performance. The imaging data may also be used to perform quality-checks on other parts of the package delivery and conveyance systems and document the condition of packages that have passed through the system.

20 Claims, 14 Drawing Sheets

Related U.S. Application Data

(60) Provisional application No. 62/832,587, filed on Apr. 11, 2019.

(51) Int. Cl.
*G06K 7/14* (2006.01)
*G06K 7/10* (2006.01)
*B65G 1/137* (2006.01)
*B65G 43/08* (2006.01)

(52) U.S. Cl.
CPC ..... *G06K 7/10445* (2013.01); *G06K 7/10861* (2013.01); *G06K 7/1404* (2013.01); *G06K 7/1443* (2013.01); *G05B 2219/25174* (2013.01); *G05B 2219/25186* (2013.01); *G05B 2219/25252* (2013.01); *G05B 2219/25257* (2013.01)

(58) Field of Classification Search
CPC .... G06K 17/0029; B65G 1/137; B65G 43/08; G05B 19/042; G05B 2219/25174; G05B 2219/25186; G05B 2219/25252; G05B 2219/25257; G05B 2219/31267; G05B 2219/32121; G05B 2219/39104; G05B 19/0426; G05B 19/056; G06Q 10/06395; G06Q 10/08; G06Q 10/10; G06Q 50/28; Y02P 90/02
See application file for complete search history.

(56) References Cited

U.S. PATENT DOCUMENTS

| | | | |
|---|---|---|---|
| 2004/0195310 A1* | 10/2004 | Silverbrook | H04N 3/1568 235/375 |
| 2006/0261157 A1* | 11/2006 | Ostrowski | G06V 20/68 235/383 |
| 2008/0245873 A1 | 10/2008 | Dwinell et al. | |
| 2009/0153549 A1 | 6/2009 | Lynch et al. | |
| 2010/0274391 A1 | 10/2010 | Dai | |
| 2013/0020391 A1* | 1/2013 | Olmstead | G06K 7/10722 235/438 |
| 2013/0020392 A1* | 1/2013 | Olmstead | G07G 1/0063 235/440 |
| 2013/0182903 A1* | 7/2013 | Nammoto | G06T 7/74 382/103 |
| 2014/0036069 A1* | 2/2014 | Gehring | G06K 7/10861 348/135 |
| 2015/0076041 A1* | 3/2015 | Irie | G06V 10/48 209/555 |
| 2015/0193761 A1* | 7/2015 | Svetal | G06Q 20/208 705/23 |
| 2015/0290802 A1 | 10/2015 | Buehler et al. | |
| 2015/0347801 A1* | 12/2015 | Svetal | G06F 18/40 235/454 |
| 2016/0147622 A1* | 5/2016 | Nichols | G06F 16/1734 714/57 |
| 2016/0221187 A1 | 8/2016 | Bradski et al. | |
| 2016/0253077 A1* | 9/2016 | Kellner | G06F 3/04847 715/788 |
| 2017/0021499 A1 | 1/2017 | Wellman et al. | |
| 2017/0136632 A1 | 5/2017 | Wagner et al. | |
| 2017/0357937 A1* | 12/2017 | Edens | G06K 19/06056 |
| 2017/0369244 A1 | 12/2017 | Battles et al. | |
| 2018/0130017 A1 | 5/2018 | Gupte | |
| 2018/0204111 A1 | 7/2018 | Zadeh et al. | |
| 2018/0250826 A1 | 9/2018 | Jiang et al. | |
| 2019/0073785 A1* | 3/2019 | Hafner | G06T 7/62 |
| 2019/0293404 A1* | 9/2019 | Abad | G01C 21/16 |
| 2019/0325712 A1* | 10/2019 | Nemati | G06Q 20/208 |
| 2020/0027002 A1 | 1/2020 | Hickson et al. | |
| 2020/0051291 A1 | 2/2020 | Cinnamon et al. | |
| 2020/0074126 A1* | 3/2020 | Winkler | B65G 1/1373 |
| 2020/0090314 A1* | 3/2020 | Mayr | G06F 18/40 |
| 2021/0076005 A1* | 3/2021 | Ketterer | G06T 7/60 |

\* cited by examiner

SYSTEMS AND METHODS FOR IDENTIFYING PACKAGE PROPERTIES IN AN AUTOMATED INDUSTRIAL ROBOTICS SYSTEM

CROSS-REFERENCE TO RELATED APPLICATIONS

This present application is a continuation of U.S. Non-Provisional patent application Ser. No. 16/846,331, filed Apr. 11, 2020 and claims the benefit of U.S. Provisional Patent Application No. 62/832,587, filed on Apr. 11, 2019, the contents of which are incorporated herein by reference in their entirety.

BACKGROUND

Field of the Art

This disclosure relates to systems and methods for improving automated robotic conveyance systems. More specifically, the present disclosure relates to systems and methods for identifying package properties in an economical and more consistently reliable manner, while, at the same time, enabling the system to detect potential failures before they happen.

Discussion of the State of the Art

Continuous flow conveyance systems, for picking or moving packages travelling on, for example, a conveyor belt, rely on imaging systems to predict or measure a package's dimensions. Once a package's dimensions are determined, the package conveyance system may identify one or more pick points to enable a robot and/or a robotics system to lift and/or otherwise move the package.

These package conveyance systems, however, tend to be expensive, unreliable, and error prone. For example, package conveyance systems often use laser line scanners, which are expensive to purchase, service, and maintain. Moreover, traditional imaging systems fail at a relatively high rate, when, for example, two or more packages are adjacent to each other or on top of each other when they are imaged. These failures often cause stoppages and reduce the overall efficiency and throughput of the system.

In addition, traditional package conveyance systems (in the context of industrial large scale robotic picking systems) do not typically work well in conjunction with human operators to enable the entire system to run smoothly and/or efficiently. Rather, traditional package conveyance systems are designed to permit a human operator to intervene after the computing system breaks down. This approach may be effective for resuming operation once breakdowns have occurred. However, this approach does little if anything to prevent breakdowns from occurring in the first place.

As a result, traditional package conveyance systems leave much to be desired in terms of reliability, efficiency, and cost.

SUMMARY

The present invention overcomes the limitations outlined above by integrating two or more data sources for imaging one or more items (hereinafter also referred to as packages, boxes, bags, envelopes, jiffys, etc., but more generally referring to any item that may or may not be in a container such as a box, etc.) on a continuous flow conveyor belt or the like. Specifically, the present invention integrates a first two-dimensional image with at least a second two-dimensional image or a three-dimensional point clouds to calculate or estimate two separate properties of a package such as its dimensions, type, shape, the location of pre-existing labels thereon, and/or determine if there are two or more packages in a pile. Moreover, the captured imaging data is transformed by the inventive system to provide real-time feedback to a local operator and/or a remote operator to enable the various operators to maintain an understanding of the system's performance and to serve as an early warning indicator suggesting that a breakdown may occur in the near future, thereby enabling the operators to intervene as appropriate before major breakdowns. The imaging data may also be stored and then later retrieved for a variety of functions such as performing quality-checks on other parts of the package delivery and conveyance systems, and documenting the condition of a package as it passed through the system for resolving insurance and/or damage claims.

A feature of the present invention is that it generates and processes data at scale that prior art system are unable to do. Generally, the elements of the present invention economically generate data for packages travelling at speeds up to approximately 300 feet per minute, and process that data at scale to determine if early intervention may be necessary. Prior art systems generally cannot process data at the speed and scale that is enabled by the present invention. Some prior art systems use laser projection systems to perform some of the tasks described herein at high speeds, but these systems do not provide the ability to review package conditions from two-dimensional ("2D") and/or three-dimensional ("3D") data at one or more specific points within the package conveyance system. The ability to review packages is an important upgrade over prior art systems because many package delivery systems and insurance providers prefer or even require this review capability to process claims or adjudicate disputes.

Another feature of the present invention is that it improves the performance of a package conveyance system. Traditionally, prior art package conveyance systems make certain assumptions about the placement and overall quality of the items. A crushed box, or misplaced envelope cannot be scanned by downstream systems and thus must be "re-worked" (i.e. it may have to be processed separately and/or may have to be processed through the system a second or multiple times). Prior art systems do not provide a mechanism for identifying these types of issues and therefore tend to be inefficient and/or more prone to breakdowns. The invention disclosed herein generally eliminates or reduces of the occurrence of these types errors and/or inefficiencies by processing data at scale and generating system level indicators that enable early intervention.

BRIEF DESCRIPTION OF THE DRAWING FIGURES

The accompanying drawings illustrate several embodiments and, together with the description, serve to explain the principles of the invention according to the embodiments. It will be appreciated by one skilled in the art that the particular arrangements illustrated in the drawings are merely exemplary and are not to be considered as limiting of the scope of the invention or the claims herein in any way.

Figure 1:
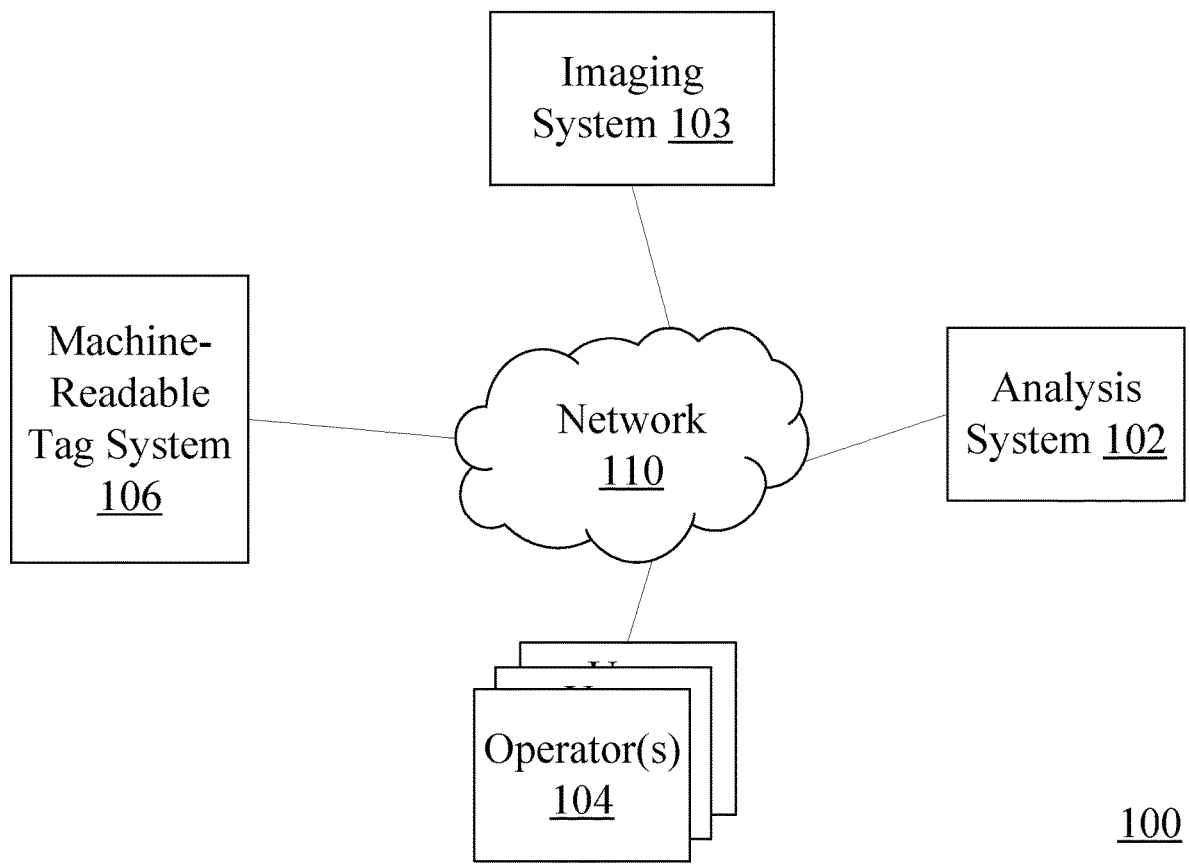
FIG. 1 is a block diagram illustrating an exemplary operating environment, in accordance with an embodiment of the invention.

As noted above, in the above reference figures, the present invention is illustrated by way of example, not limitation, and modifications may be made to the elements illustrated therein, as would be apparent to a person of ordinary skill in the art, without departing from the scope of the invention.

DETAILED DESCRIPTION

The applicant has conceived, and reduced to practice, a system and method for identifying package properties in an automated industrial package conveyance system, and using those metrics to enable improved data retrieval practices, improved efficiency by enabling early human intervention when appropriate, locating available free space on packages for automatically applying additional labels as desired, and/or recording particular package properties and details for retrieval in a database.

More specifically, the applicant has invented a method for identifying item properties in an automated industrial package continuous flow conveyance system, the method comprising, obtaining an interrupt notification associated with a through beam, wherein the interrupt notification is obtained when at least one package traveling allowing the continuous flow path triggers an interrupt notification by, for example, crossing into an interrogation region of, for example, a interrupt sensor, a through beam, a motion detector, etc., obtaining a data signal associated with a machine-readable tag such as a barcode or the like, the data signal being associated with at least one package that triggered the interrupt notification, obtaining two-dimensional data associated with at least one package, obtaining at least a second two-dimensional data and/or a three-dimensional data associated with the at least one package, synthesizing an aggregate of the machine-readable tag signal data, two-dimensional data, and three-dimensional data to obtain system level indication of the at least two different properties of the package such as the system's throughput and error rate, and transforming the one or more of the machine-readable tag signal data, two-dimensional data, and three-dimensional data to provide feedback to an operator.

The method described herein also comprising analyzing the two-dimensional and/or three-dimensional data to determine the two separate properties of the package such as whether more than one package passed the through beam when the interrupt notification is generated. The determination of one or both of those properties may be made by applying an AI classifier to the two-dimensional and/or three-dimensional data. For example, the major axis, minor axis, and/or a flatness measure may be used to determine whether more than one package passed the through beam when the interrupt notification is generated.

The method described herein may also comprise of computing system level data and feedback data. System level data may be comprised of throughput data and/or error rate data. In one embodiment, the system's throughput may be determined by calculating the number of single packages with detected barcode data that pass the through beam at any given time. The system's error rate may be determined by calculating the number of single packages with missing barcode data and/or if multiple packages are identified as being in a pile. The feedback data may be comprised a notification indicating whether single or multiple packages were detected as one throughput interrupt events. Feedback data be comprised a notification indicating whether the package is oversized. In one embodiment, the system level data may be provided to a remote operator and/or a local operator. The feedback data may be provided to a local operator and/or a remote operator. The system level data and/or the feedback data may be used as an early waring indicator of when the robotic picking and conveyance system may be running inefficiently and/or may be likely to break down.

The method described herein further comprising obtaining image data of one or more packages that trigger the interrupt notification. Wherein the barcode data, the two-dimensional data, the three-dimensional data, and/or the image data may be associated in a database. The associated data may be used to determine whether a package was damaged when it triggered the interrupt notification.

The method described herein further comprising the system collecting and weight information of each package as it passes through the interrogation region, and the system compiling and storing the measured weight of each package for future recall and analysis.

The method described herein further comprising at least one of the properties of the package detected by the system including determining the location of pre-existing labels on the package to define "keep out" and "free" zones on the package for further use such as to determine where to apply additional labels downstream of the scanner.

One or more different embodiments may be described in the present application. Further, for one or more of the embodiments described herein, numerous alternative arrangements may be described; it should be appreciated that these are presented for illustrative purposes only and are not limiting of the embodiments contained herein or the claims presented herein in any way. One or more of the arrangements may be widely applicable to numerous embodiments, as may be readily apparent from the disclosure. In general, arrangements are described in sufficient detail to enable those skilled in the art to practice one or more of the embodiments, and it should be appreciated that other arrangements may be utilized and that structural, logical, software, electrical and other changes may be made without departing from the scope of the embodiments. Particular features of one or more of the embodiments described herein may be described with reference to one or more particular embodiments or figures that form a part of the present disclosure, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible embodiments and in order to more fully illustrate one or more embodiments. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the embodiments, and does not imply that the illustrated process is preferred. Also, steps are generally described once per aspect, but this does not mean they must occur once, or that they may only occur once each time a process, method, or algorithm is carried out or executed. Some steps may be omitted in some embodiments or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various embodiments in which, for example, functions may be executed out of order from that shown or discussed, including substantially concurrently or in reverse order, depending on the functionality involved, as would be understood by those having ordinary skill in the art.

Overview

FIG. 1 illustrates a block diagram of an exemplary operating environment, in accordance with an embodiment of the invention. It is comprised of an analysis system 102, an imaging system 103, an operator system 104, a machine-readable label or tag such as a barcode system 106 or the like, and a network 110. It is noted that multiple instances of the disclosed systems and sub-systems may be present in various embodiments, and that references herein to a system or a sub-system generally refers to one or more of the systems or sub-systems. In an alternative embodiment, the functionalities of multiple agents may be merged, modified, or split into a functionally equivalent set of systems and sub-systems. The various computing agents may comprise one or more computing devices, like the computing device 10 illustrated in FIG. 5, the computer system 40 illustrated in FIG. 8.

As disclosed herein, the imaging system 103 refers to a system for imaging one or more packages that cross a threshold on a conveyor belt system or the like. In one embodiment of the invention, the imaging system obtains one or more two-dimensional data and/or three-dimensional data of items/packages that reach a particular point on a conveyor belt (the point hereinafter also referred to as a package scanning region). The imaging system 103 may also obtain other information about the packages, including, but not limited to three-dimensional data (such as, for example, three-dimensional point clouds) of the items/packages, infrared images, sonographic and other depth sensing data, etc. As explained in greater detail below in reference to the analysis system 102 and FIGS. 2 and 9, the obtained two-dimensional and/or three-dimensional data may be used to calculate a variety of information that permits the robotics system to process the data and/or generate early warning indicators. In one embodiment, the imaging system 103 may be comprised of cameras, camera mounts, light strips, etc. which are described in greater detail in reference to FIGS. 10-15.

An advantage of the imaging system 103 described herein is that it can be used to capture one or more 2D and/or 3D images of packages at one or more points within the continuous flow package conveyance system. For example, the data may be obtained when a package leaves a truck, a shipping container, etc., and then again at a sortation facility, picking facility, etc. The 2D and/or 3D images may be stored in a database and may be retrievable in reference to a particular package. This ability enables a shipper, or an insurance company, for example, to evaluate damage claims. In other instances, it permits the package conveyance system providers to determine if and/or where deformation or other damage to a package occurred within the system. Under the prior art systems, as described in greater detail above, this review ability is simply not available because prior art systems are unable to perform the measurements and/or calculations at the speed and scale described herein.

The machine-readable tag system 106, as disclosed herein, refers to a system for scanning a machine-readable tag data that may be affixed to an item/package that may be imaged by the imaging system 103. The machine-readable tag system 106 may refer to, for example, a barcode scanning system, a QR code scanning system, a radio frequency identification (RFID) detection systems, etc. In one embodiment of the invention, the machine-readable tag system 106 enables the system to identify an item/package based on a machine-readable tag that is placed on the package. In this embodiment, the data associated with the machine-readable tag may be associated with an entry in a database. In such an embodiment, the analysis system 102, for example, may retrieve the database entry, wherein the database entry may include additional information about the package, including, but not limited to, package dimensions, weight, handling instructions, etc. In one embodiment, the database housing the relevant data may be maintained by a third party and may be accessed by a variety of different communications protocols over a network, such as API calls, etc., as would be readily understood by a person of ordinary skill in the art.

The analysis system 102 refers to a system that obtains data from the imaging system 103 and the barcode system 106 and performs additional analysis on the data to make the package conveyance system more efficient. For example, the analysis system 102 may use the obtained data to determine if a pile of packages comprising two or more packages are imaged as one item/package by the imaging system 103. The analysis system 102 may also transform the obtained data to detect the type of package that is imaged by the imaging system 103. Package properties, such as flatness, major and minor axes, etc. may also be computed by the analysis system 102. The analysis system 102 also transforms the data for presentation to a local and/or a remote operator. In one embodiment of the invention, the analysis system 102 synthesizes relevant data regarding throughput, package piles, etc. to enable the operator to intervene in a timely and meaningful manner. In other words, unlike prior art systems, which enable operators to intervene when errors occur, the analysis system 102 of the present invention enables operators to be proactive by monitoring and synthesizing relevant data that enables the system to run efficiently and with fewer interruptions.

In one embodiment, the analysis system 102 may use an artificial intelligence classifier to determine if a label can be detected from the two-dimensional data. In one embodiment, the analysis system 102 may identify geometric features from the three-dimensional data. The geometric features, such as major axis, minor axis, and/or flatness measure may be used to determine if more than one item is present in, for example, a pile, within the package scanning region. In one embodiment, the two dimensional data is aligned to the three-dimensional data to map the two datasets in, for example, a 1:1 configuration. The aligned dataset may be used to transpose the label identified in the two-dimensional data to the three-dimensional data. By doing so, the X, Y, and Z dimension data of the label may be obtained. The label location data may be used to identify "keep out" zones and "free" zones, wherein "keep out" zones indicate areas on an item/package that should not be occluded, and "free" zones representing areas of an item/package where additional labels may be affixed. In one embodiment, the "keep out" zones overlap with the location/surface area of the label that is identified/located within the aligned three-dimensional data. The "free" zones do not overlap the location/surface area of the label that is identified/located within the aligned three-dimensional data, and overlaps the surface area of items/packages that are imaged by the analysis system 102. In one embodiment, the data obtained by the analysis system 102 may be used to calculate and/or approximate dimensions of the one or more packages that cross a certain threshold on a conveyor belt system. A variety of dimension calculation methodologies may be used as described herein. For example, package dimensions may be determined by identifying major and/or minor axis of the items in a three dimensional image. A lookup table and/or a rules based lookup engine may reference pre-calculated values to compute/identify the shape and/or size of the item(s)/package(s).

Figure 9:
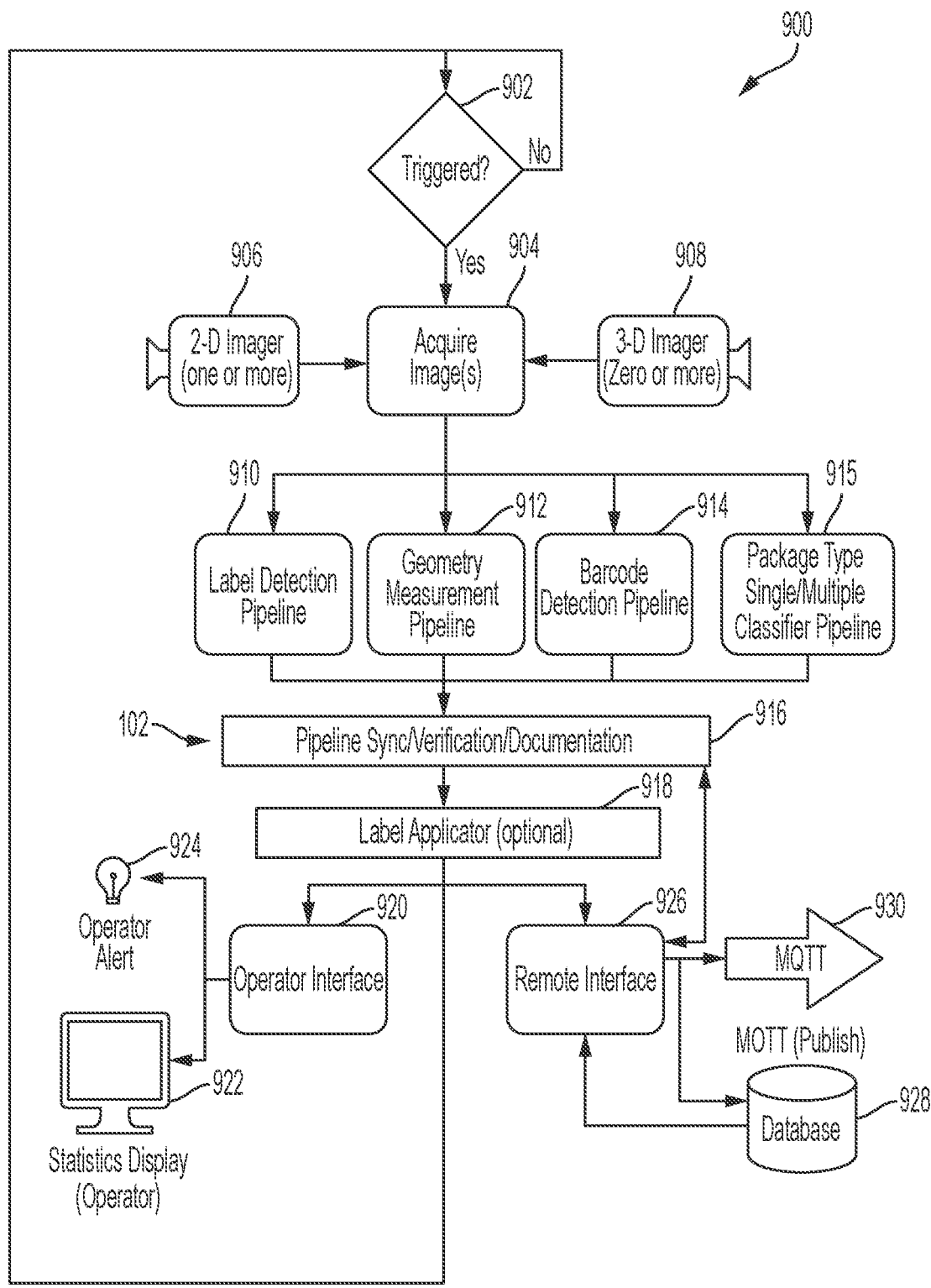
FIG. 9 is a flow chart showing possible steps for using and processing information acquired from the computing system in accordance with an embodiment of the invention.

The operator(s) 104 refers to a local operator's computing device and/or a remote operator's computing device; these devices are also referred to as items 920 and 926, respectively in FIG. 9. The local operator may be at a location wherein the operator may quickly access the conveyance system to intervene and facilitate processing at the conveyance system. The remote operator may be at a location that is remote from the conveyance system. In one embodiment, as described in greater detail below, the operator 104 may be provided with data captured by the imaging system 103. The operator 104 may provide a pick point, a notification that the pick area is empty, and/or a notification that a pick point is unavailable.

The network 110 connects the various systems and computing devices described or referenced herein. In particular embodiments, network 110 is an intranet, an extranet, a virtual private network (VPN), a local area network (LAN), a wireless LAN (WLAN), a wide area network (WAN), a metropolitan area network (MAN), a portion of the Internet, or another network 421 or a combination of two or more such networks 110. The present disclosure contemplates any suitable network 110.

One or more links couple one or more systems, engines or devices to the network 110. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable links coupling one or more systems, engines or devices to the network 110.

In particular embodiments, each system or engine may be a unitary server or may be a distributed server spanning multiple computers or multiple datacenters. Systems, engines, or modules may be of various types, such as, for example and without limitation, web server, news server, mail server, message server, advertising server, file server, application server, exchange server, database server, or proxy server. In particular embodiments, each system, engine or module may include hardware, software, or embedded logic components or a combination of two or more such components for carrying out the appropriate functionalities implemented or supported by their respective servers. For example, a web server is generally capable of hosting websites containing web pages or particular elements of web pages. More specifically, a web server may host HTML files or other file types, or may dynamically create or constitute files upon a request, and communicate them to clients devices or other devices in response to HTTP or other requests from clients devices or other devices. A mail server is generally capable of providing electronic mail services to various client devices or other devices. A database server is generally capable of providing an interface for managing data stored in one or more data stores.

In particular embodiments, one or more data storages may be communicatively linked to one or more servers via one or more links. In particular embodiments, data storages may be used to store various types of information. In particular embodiments, the information stored in data storages may be organized according to specific data structures. In particular embodiment, each data storage may be a relational database. Particular embodiments may provide interfaces that enable servers or clients to manage, e.g., retrieve, modify, add, or delete, the information stored in data storage.

In particular embodiments, the operator's device 104 (also referred to as a user device herein) may be an electronic device including hardware, software, or embedded logic components or a combination of two or more such components and capable of carrying out the appropriate functions implemented or supported by the user device 104. For example and without limitation, a user device 104 may be a desktop computer system, a notebook computer system, a netbook computer system, a handheld electronic device, a mobile telephone and/or a transducer such as one or more signaling lights (416, FIG. 4A) or speakers. The present disclosure contemplates any user device 104. A user device 104 may enable a network user at the user device 104 to access network 110. A user device 104 may enable its user to communicate with other users at other user devices 104.

An operator's device 104 may have a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user device 104 may enable a user to enter a Uniform Resource Locator (URL) or other address directing the web browser to a server, and the web browser may generate a Hyper Text Transfer Protocol (HTTP) request and communicate the HTTP request to server. The server may accept the HTTP request and communicate to the user device 104 one or more Hyper Text Markup Language (HTML) files responsive to the HTTP request. The user device 104 may render a web page based on the HTML files from server for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

The operator's device 104 may also include an application that is loaded onto the user device 104. The application 104 obtains data from the network 110 and displays it to the user within the application 533 interface.

Exemplary user devices are illustrated in some of the subsequent figures provided herein. This disclosure contemplates any suitable number of user devices, including computing systems taking any suitable physical form. As example and not by way of limitation, computing systems may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computing system may include one or more computer systems; be unitary or distributed; span multiple locations; span multiple machines; or reside in a cloud, which may include one or more cloud components in one or more networks. Where appropriate, one or more computing systems may perform without substantial spatial or temporal limitation one or more steps of one or more methods described or illustrated herein. As an example, and not by way of limitation, one or more computing systems may perform in real time or in batch mode one or more steps of one or more methods described or illustrated herein. One or more computing system may perform at different times or at different locations one or more steps of one or more methods described or illustrated herein, where appropriate.

Figure 2:
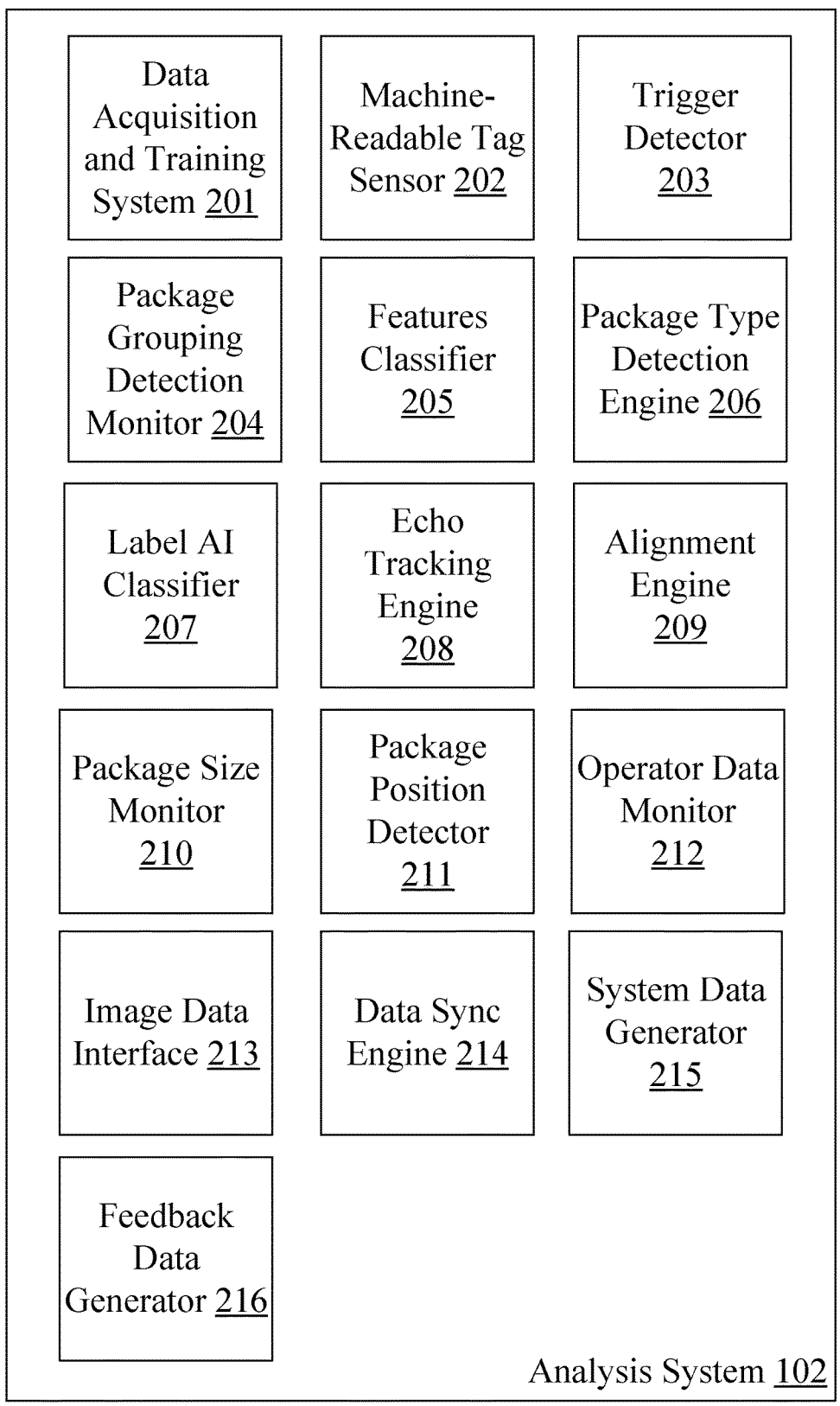
FIG. 2 is a block diagram illustrating an exemplary imaging and notification system, in accordance with an embodiment of the invention.

FIG. 2 illustrates the analysis system 102 in greater detail, in accordance with an exemplary embodiment of the invention. It may be comprised of a data acquisition and training system 201, machine readable tag sensor 202, trigger detector 203, a package grouping detection monitor 204, features classifier 205, a package type detection engine 206, label AI classifier 207, an echo tracking engine 208, alignment engine 209, a package size monitor 210, a package position detector 211, an operator data monitor 212, image data interface 213, data sync engine 214, system data generator 215, and feedback data generator 216. The various systems/engines enable the analysis system 102 to identify one or more properties of the package.

The data acquisition and training system 201 obtains training data from one or more sources and applies a training model for the various AI systems described herein. The system and method for obtaining data and using a training model would be readily apparent to a person of ordinary skill in the art, and may be used herein, without departing from the scope of the invention.

The trigger detector 203 generates an interrupt notification indicating that one or more items traveling along a continuous flow conveyance have crossed a through beam. In various embodiments, the trigger detector 203 may be comprised of, but is not limited to a motion sensor, an IR sensor, a laser sensor, etc. In one embodiment, the trigger detector 203 may generate an alert when an item travelling along a continuous flow conveyance enters a package scanning region. The package scanning region may refer to a portion of the conveyance system wherein the various cameras, imaging systems, and sensors may detect and/or scan items. In one embodiment, the various imaging systems and scanners/sensors may activate once the trigger detector 203 generates an interrupt notification.

In one embodiment of the invention, the machine-readable tag sensor 202 detects when a machine-readable tags (such as, for example, a barcode, a QR code, or other identification representations) are detected on an item/package that is travelling in a conveyance system described herein. For example, if a barcode is present and visible on a package, then the barcode detection monitor 202 generates a signal suggesting the presence of a barcode. Similarly, if the barcode is not present or visible, the machine readable tag sensor 202 generates a signal suggesting the absence of a barcode. The ability to scan a barcode is generally important in further processing the package during downstream operations. As such, the machine readable tag sensor's 202 ability or inability to detect a barcode represents an early indicator of whether additional processing or user intervention may be required. In one embodiment, the machine-readable tag sensor 202 retrieves additional detail associated with the machine-readable tag, including, but not limited to, package dimensions, weight, handling instructions, etc. This information may be retrieved via a network using communication methodologies that would be known to persons of ordinary skill in the art, including, but not limited to API calls, server calls, etc.

The image data interface 213 interfaces with the imaging system 103 to obtain two-dimensional and/or three-dimensional data of the one or more items travelling along a continuous flow conveyance system. More specifically, in one embodiment, the image data interface 213 obtains imaging data of items within the package scanning region.

The label AI classifier 207 applies an artificial intelligence classifier to the two-dimensional data obtained by the image data interface 213 to determine whether a label is affixed to one or more items in the package scanning region.

The features classifier 205 identifies geometric features of the one or more items from the obtained three-dimensional data. A variety of geometric features may be obtained by the features classifier 205, including, but not limited to one or more major axes, minor axes, and/or a flatness measure. These geometric features and/or a combination of these features may be used to calculate other values such as the size and/or shape of the items within the package scanning region. The geometric features may also be used to identify whether two or more items/packages are in the package scanning region in a pile and appearing as one, as described in more detail below.

The alignment engine 209 aligns the three-dimensional data with the first two-dimensional data. A variety of alignment methodologies, known to persons of ordinary skill in the art, may be used without departing from the scope of the invention. In one embodiment, the alignment engine 209 aligns the 2D and the 3D data in 1:1 symmetry. The alignment engine 209 may also identify the location of the label in the aligned three-dimensional data if a label is identified by the artificial intelligence classifier in the two-dimensional data.

The package grouping detection monitor 204 transforms the data obtained by the imaging system 103 to determine whether two or more packages are placed together in a package pile. In one embodiment of the invention, the package grouping detection monitor 204 applies data transformation on the two-dimensional image to determine whether two or more packages are imaged together by the imaging system 103.

Any number of digital data analysis systems and/or models may be applied to make this determination, as would be readily apparent to a person of ordinary skill in the art, without departing from the scope of the invention. In one embodiment, the package grouping detection monitor 204 applies mathematical transformation on the three-dimensional image cloud generated by the imaging system 103 to determine whether two or more packages were detected as one package by the imaging system 103. Any number of digital data analysis systems and/or models may be applied to make this determination, as would be readily apparent to a person of ordinary skill in the art, without departing from the scope of the invention. In one embodiment, the package grouping detection monitor 204 applies data transformation on a combination of two-dimensional and three-dimensional data to determine whether two or more packages in a pile of packages were identified as one package by the imaging system 103. In one embodiment of the invention, the package grouping detection engine 204 uses data about a package, such as, but not limited to, the package's major axis, minor axis, and/or a flatness measure to determine whether more than one package passed the through beam when the interrupt notification is generated. In one embodiment, an AI classification approach may be used to determine one or more properties of a package such as whether two or more packages are placed together in a pile. As would be readily understood by a person of ordinary skill in the art, the AI classifier may be trained using data from packages that are and/or are not placed in a pile together. The classification model generated by the AI classifier may be created by using a variety of different mathematical systems and processes. If an AI classifier is used, the model generated by the classifier may be used to determine whether two or more packages are placed together in a pile. In one embodiment of the invention, the grouping detection monitor 204 may choose to use one model (i.e. the AI classifier vs traditional systems described herein) based on the complexity of the problem and other relevant conditions, including, but not limited to the speed with which picking decisions must be made, etc.

The package type detection monitor 206 determines the type of package that is imaged by the imaging system 103. In one exemplary embodiment, the package may be detected as a box, a bag, a jiffy. In one embodiment of the invention, the package type detection monitor 206 applies data transformation collected from the collected two-dimensional and/or three-dimensional images to determine the type and/or shape of the package imaged by imaging system 103. Any number of digital data analysis systems and/or models may be applied to make this determination, as would be readily apparent to a person of ordinary skill in the art, without departing from the scope of the invention. In one embodiment, the package type detection monitor 206 applies mathematical transformation on the three-dimensional image cloud generated by the imaging system 103 to make this determination. Any number of digital data analysis systems and/or models may be applied to make this determination, as would be readily apparent to a person of ordinary skill in the art, without departing from the scope of the invention. In one embodiment, the package detection monitor 206 applies data transformation on a combination of two-dimensional and three-dimensional data to determine the shape and type of the package by the imaging system 103. In one embodiment of the invention, the package type detection monitor 206 uses data about a package, such as, but not limited to, the package's major axis, minor axis, and/or a flatness measure to determine package type when the interrupt notification is generated. In one embodiment, an AI classification approach may be used to determine this information. As would be readily understood by a person of ordinary skill in the art, the AI classifier may be trained using data from known types of packages. The classification model generated by the AI classifier may be created by using a variety of different mathematical systems and processes. If an AI classifier is used, the model generated by the classifier may be used to determine package size and type. In one embodiment of the invention, the package type detection monitor 206 may choose to use one model (i.e. the AI classifier vs traditional systems described herein) based on the complexity of the problem and other relevant conditions, including, but not limited to the speed with which picking decisions must be made, etc.

The package type information, as described in greater detail below, may be used to generate reporting metrics for an operator to enable the operator to intervene in a timely manner and/or enable the operator to implement incremental changes that may improve the overall throughput and/or efficiency of the industrial package conveyance system.

The echo tracking engine 208 determines when a user interacts with an interface element on the operator 104 system. The user interaction may be comprised of an intervention or some other input. For example, if a user selects a calibrate command, background select command, or reset count command, those commands may be logged by the echo tracking engine 208. As described in greater detail below, the logged information may be used to generate system level data for enabling early intervention by an operator as may be appropriate.

The package size monitor 210 determines whether one or more packages imaged by the imaging system 103 are oversized. Oversized packages may exhaust the fitting and/or filtering systems that may be applied to determine whether two or more packages in a pile of packages are detected as one. In other instances, an oversized package may indicate that there are multiple packages in a pile, that the package extends outside the field of view of the system, and/or that the package is larger than the system design specification. All of these factors may affect the performance of the package conveyance system, and, as such, the package size monitor 210 enables the system to generate data and crate alerts for early intervention.

The package position monitor 211 measures the relative position and orientation of package(s) that are placed on a conveyor belt/conveyance system/package scanning region. In one embodiment of the invention, the package position monitor 211 measures the position and/or orientation of a package relative to the belt. In other embodiments, the package position monitor 211 measures the position and/or orientation of a package relative to fixed points, or other relative markers within the package conveyance system. In one embodiment of the invention, if a package is measured to be misaligned and/or misoriented, the system 100 generates an alert, which may be conveyed to a user or an operator's computing device 104.

The various analysis and systems described above in reference to FIG. 2 may process in parallel. The data sync engine 214 syncs the data into an associated data file and/or a database to enable the various data aggregation/synthesis, and/or damage tracking systems and steps described herein. A variety of data syncing methodologies may be used, as would be readily apparent to a person of ordinary skill in the art, without departing from the scope of the invention.

The operator data monitor 212 provides a synthesis of various observed data points described herein to enable the operator to monitor the system in an informed capacity and apply early intervention strategies to ensure that the system does not suffer major breakdowns or outages. In one embodiment, the operator data monitor 212 provides a variety of package level information, including, but not limited to, a count of single packages with detected barcodes, multi-packages (more than one package detected), empty (number of triggers with no detected packages), oversized packages (packages with dimensions over-spec), number of barcodes, single packages with no barcodes, last record, package dimensions, barcode numbers, package type, enumerated echo from the graphical user interface command (such as calibrate, background, reset counts, etc.). Additionally, feedback level data (which also may be generated by the feedback data generator 216) may be presented to the user in the form of number of successes, number of triggers, percent of accuracy, etc. Finally, system level data (which also may be generated by system data generator 215) such as read rates (i.e. single packages with and without barcodes up), throughput (i.e. single packages with barcodes up per a unit of time), error rates, etc. may also be generated. The various data points enable remote and/or a local operator to intervene if for example, early warning data suggests that the system may become inefficient and/or may be likely to break down.

Figure 3:
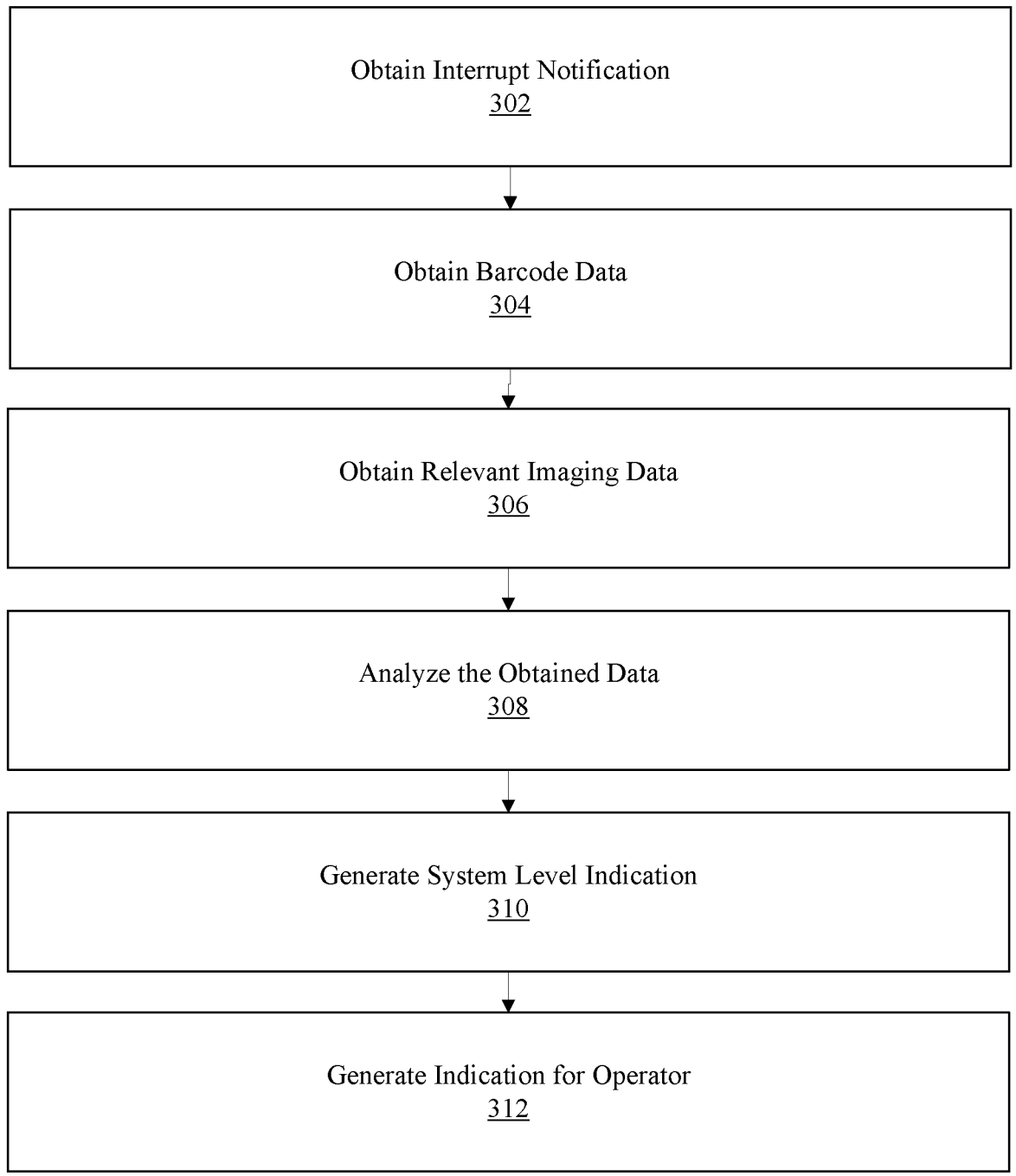
FIG. 3 is a flow diagram illustrating an exemplary method for imaging and packages and notifying users about efficiency metrics.

FIG. 3 a flow diagram illustrating an exemplary method 300 for imaging packages and generating metrics to monitoring the system. The process typically starts with an interrupt notification 302, which may be initiated when a package crosses a beam on a conveyor belt or the like. In step 304, the system determines if a machine-readable tag such as a barcode is visible on the package. The barcode may be identified by an imaging system, an IR scanning systems, an NFC chip system, etc. The process also includes the step of obtaining 306 relevant image data from imaging system, including, but not limited to a first two-dimensional image data, a second two-dimensional image date and/or a three-dimensional image date, and data provided by barcode database interface. The process analyzes 308 the obtained 2D/3D data to determine, for example, the location of a label within a three-dimensional point cloud that is aligned with the two-dimensional data. A variety of package properties may be identified in the analysis step 308, including major and/or minor axis, flatness measure, etc. The various data points may be used to determine if there is more than one item is in the package scanning region. The process continues by generating system level data 310 and operator indication data 312

Aggregate level data may include, for example, the number of successes, number of triggers, percent of accuracy, etc. System level data may be comprised of, for example, read rates (i.e. single packages with and without barcodes up), throughput (i.e. single packages with barcodes up per a unit of time), error rates, etc. An indictor encapsulating these data points and derived metrics my be generated 312 and provided to the operator, such as a green sign or flag, which may be displayed on the operator's terminal.

Figure 4A:
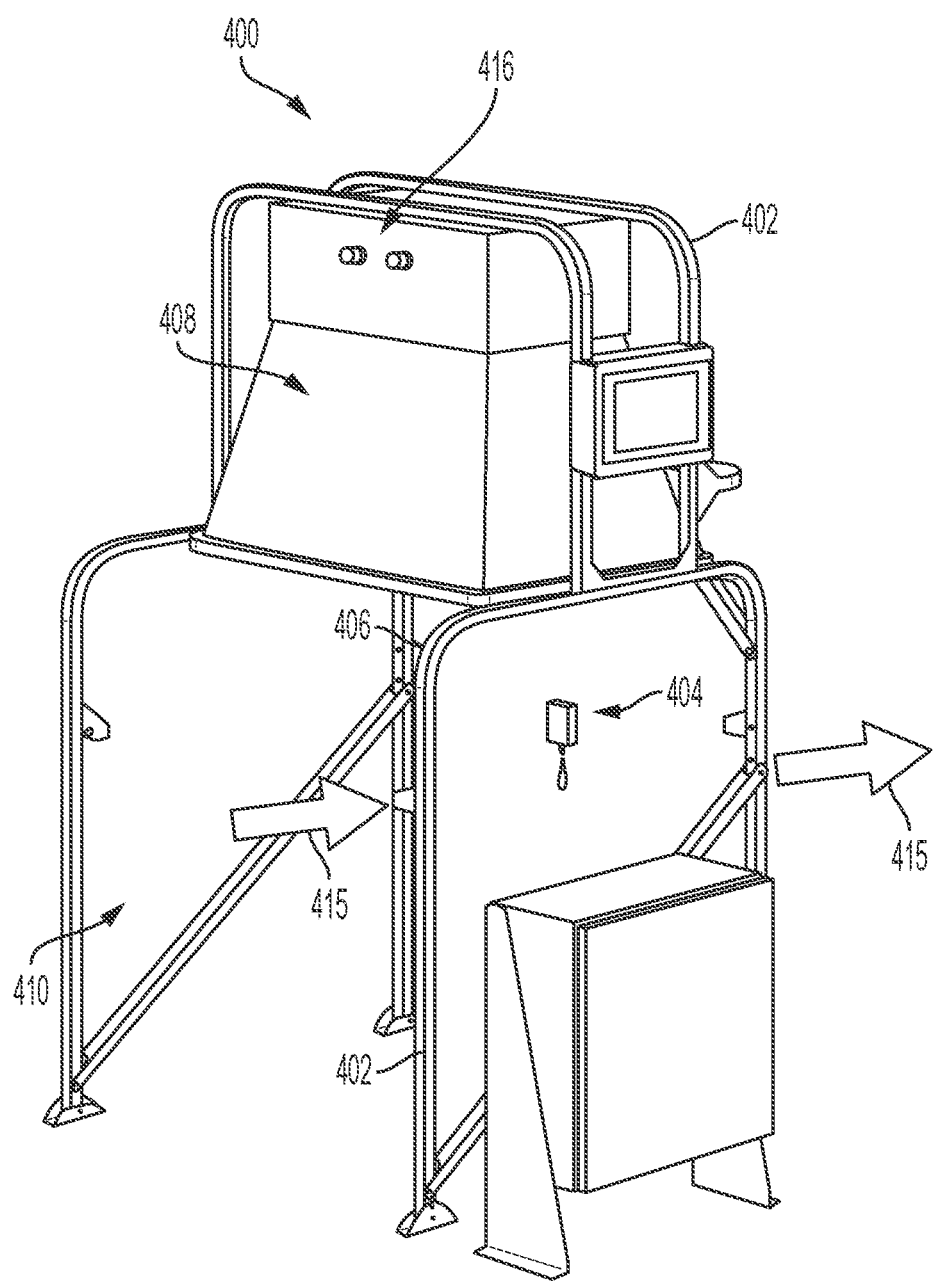
FIGS. 4A & 4B illustrate exemplary imaging stations in accordance with an exemplary embodiment of the invention.

FIGS. 4A and B illustrate a possible exemplary and non-limiting package conveyance system having an exemplar scanning station 400 in accordance with an embodiment of the invention.

The scanning station 400 may include enabling components operably secured to a frame 402. These enabling components may include one or more two dimensional cameras, at least one three dimensional camera, a machine readable tag/label reader such as a bar code scanner or the like, and a sensor 404 for detecting the presence of a package within a defined package interrogation region 406 of the scanning station 400. The enabling components are in operable communication with a computer system 100 (FIG. 1) and its analysis system 102 (FIG. 2), and they are positioned so as to scan packages as they pass along a continuous flow conveyance system such as a conveyor bels 414 (FIG. 4B) or the like through the interrogation region 406 of the scanning station 400.

Figure 4B:
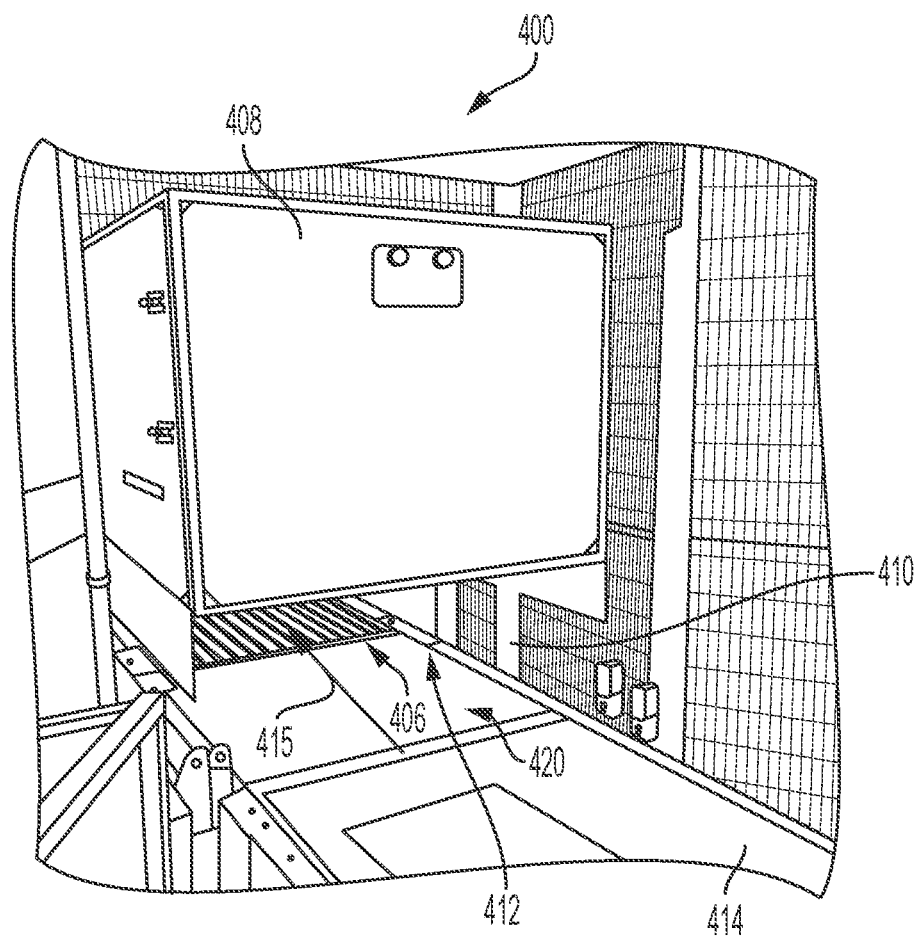

The enabling components may be protected by a housing 408, that is preferably removable. The lower portion 410 of the frame 402 defines an opening 412 that allows a conveyor belt 414 or the like to extend therethrough and under the lower edge of the housing by a spaced-apart distance defining a package flow-path 415. This spaced-apart distance defines the maximum height of a package that me be received through the scanning station 400, and the area below the housing defines the package scanning region 406 for the enabling components as best shown in FIG. 4B.

If desired, a scale 420 for measuring the weight of each package as it passes through the scanning region may be operably secured to the conveyor belt 414. The scale may be in communication with the computer system that is collecting and compiling information from the enabling components so that the computer system and associate each package's measured weight with other information collected by the enabling components.

The frame 402 may be portable to allow it to be temporarily positioned over a conveyor belt 414, for example when using a portable conveyor belt to load or unload packages from a vehicle. Alternatively, the frame 402 may be more rigidly secured above a more permanent conveyor belt, for example when positioned along an established receiving or sorting area package flow-path within a warehouse or the like.

One or more transducers 416, such as lights or speakers, may be operably secured to the scanning station to light based on predetermined criteria. For example, a green light may indicate the system is functioning normally. While a yellow or red light can indicate a detected discrepancy with the one or more packages being scanned or with the scanning system itself.

Figure 10:
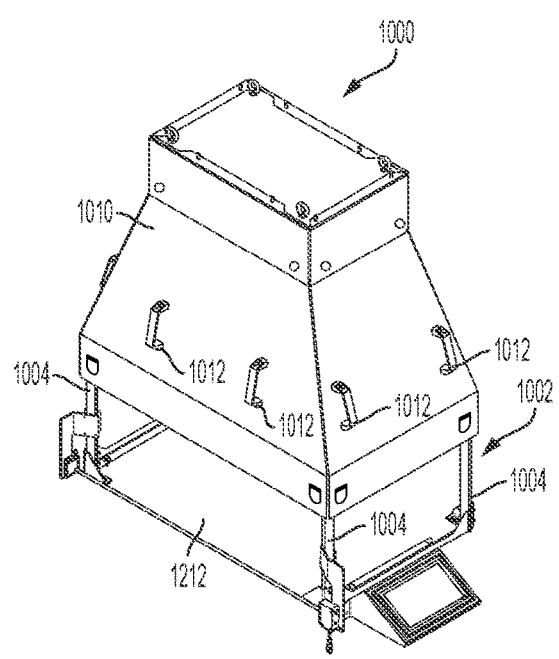
FIG. 10 is a top right isometric view of an exemplar imaging station in accordance with an embodiment of the invention.
Figure 11:
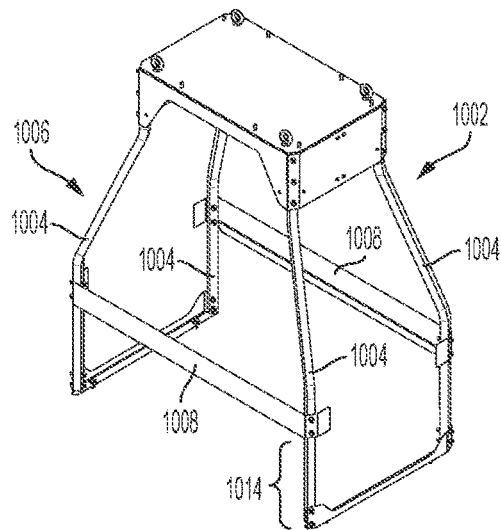
FIG. 11 is a top right isometric view of a support frame for supporting the exemplar imaging station of FIG. 10 in accordance with an embodiment of the invention.

Referring to FIGS. 10-15, an alternative possible scanning station 1000 is disclosed. As best shown in FIG. 11, a frame 1002 is formed by vertically directed upward corner posts 1004 that taper towards each other towards their upper ends 1006. The corner posts 1004 are secured with cross-brackets 1008 to ensure rigidity of the frame and define the package scanning region therein.

Referring to FIGS. 10 & 13-15, a shroud 1010 encloses the upper tapered, portion of the frame 1000 as shown. Preferably, each side of the shroud is detachably secured to the frame and includes handles 1012 to facilitate independent installation and removal from the frame so each side of the shroud may include handles.

The frame 1002 is open at its lower end 1014 to allow a conveyor belt or the like to be received therethrough defining the flow-path of packages through the scanning station 1000. A sensor 1016, such as a beam sensor or the like, is in communication with the computer system and detects when a package as entered into the package scanning region of the scanning station.

Figure 12:
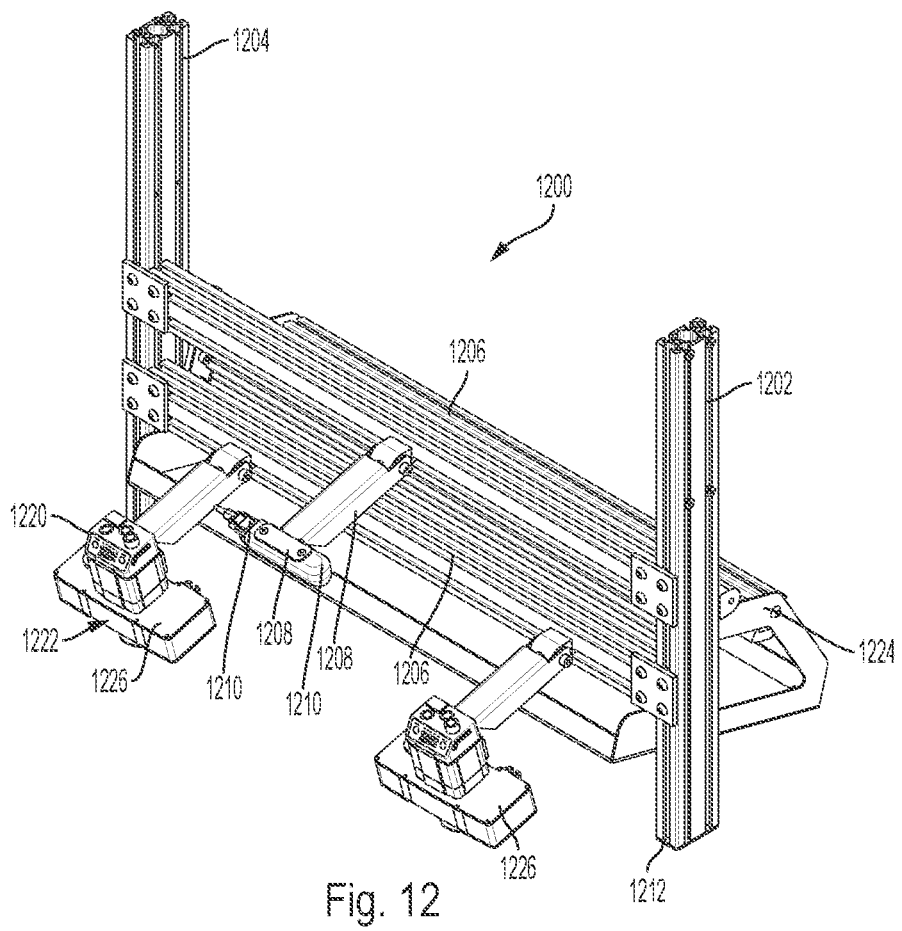
FIG. 12 is an enlarged, fragmentary, isometric view of a camera frame assembly for use with the exemplar imaging station of FIG. 10 in accordance with an embodiment of the invention.
Figure 13:
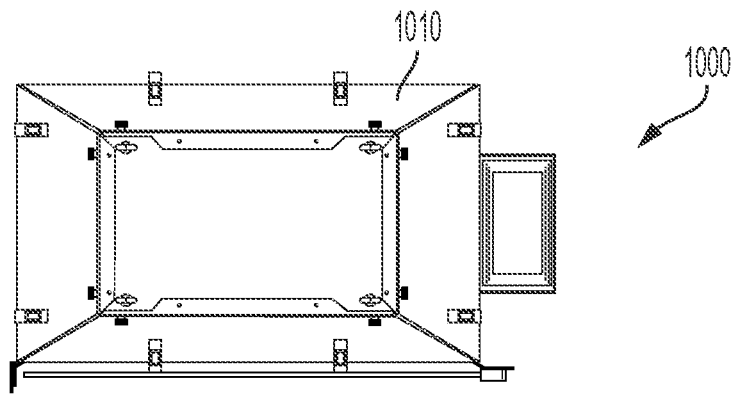
FIG. 13 is a top view of the exemplar imaging station of FIG. 10.
Figure 14:
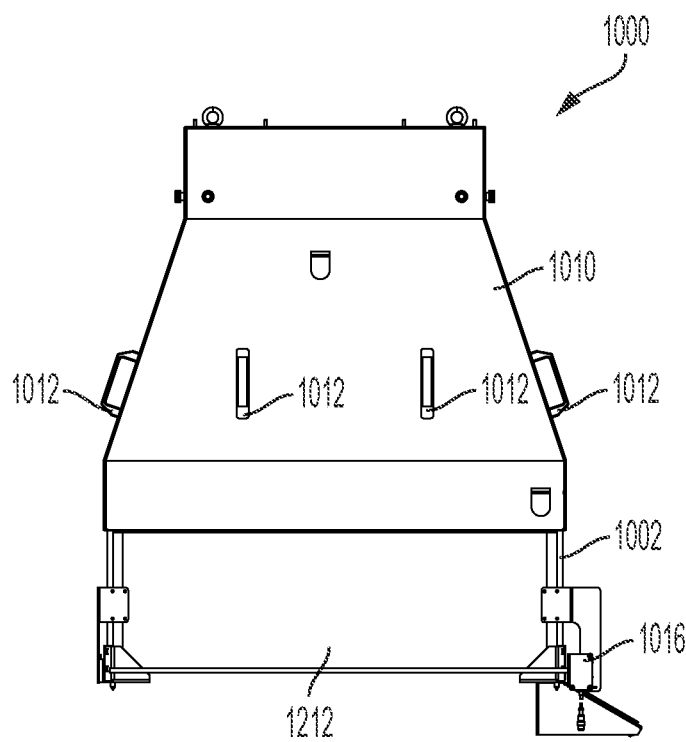
FIG. 14 is a front view of the exemplar imaging station of FIG. 10.
Figure 15:
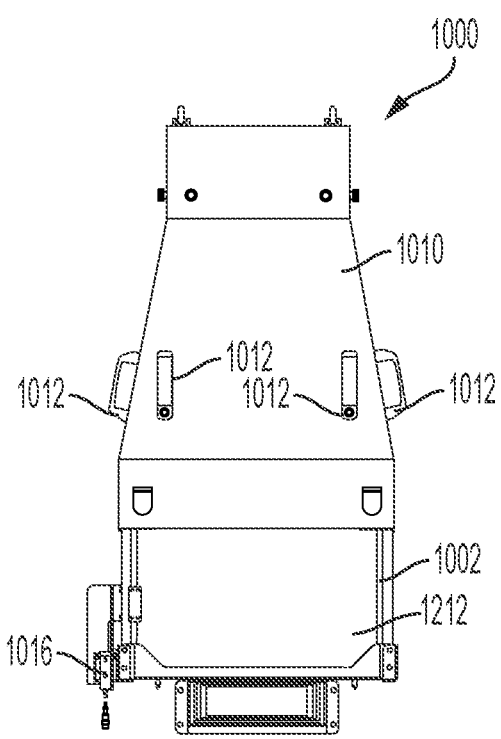
FIG. 15 is a right, side view of the exemplar imaging station of FIG. 10.

Referring to FIG. 12, a camera frame 1200 containing enabling components of the scanning station 1000 is shown. The camera frame 1200 is operably connected to the frame 1002 of the scanning station 1000 within the shroud 1010 and may include left and right frame mounting poles 1202, 1204, respectively, with cross posts 1206 extending between.

Adjustable camera mounts 1208 are spaced apart from each other by a defined distance and extend from the cross posts 1206 so as to direct cameras 1210 mounted to them toward the center of the package scanning area 1212 below. At least two cameras 1210 are secured to the mounts 1208 to allow a three-dimensional image of each package scanned to be determined and rendered. One camera can be a two-dimensional camera and the other camera can be either a two-dimensional camera or a three-dimensional camera. Preferable, at least one camera is a three-dimensional camera to allow non-rectangular packages to be properly rendered by the system.

An adjustable machine-readable tag/label reader mount 1220 also may extend from the cross-post and operably secure a machine-readable tag/label reader 1222 thereto. For example, the machine-readable tag/label reader may be a bar code reader or the like.

One or more light strips 1224, such as LED light strip may extend along the cross posts 1206. Additional lights 1226 may be provided to minimize package image shadows for the cameras when a package is within the package scanning region 1212 of the scanning station 1000.

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Figure 5:
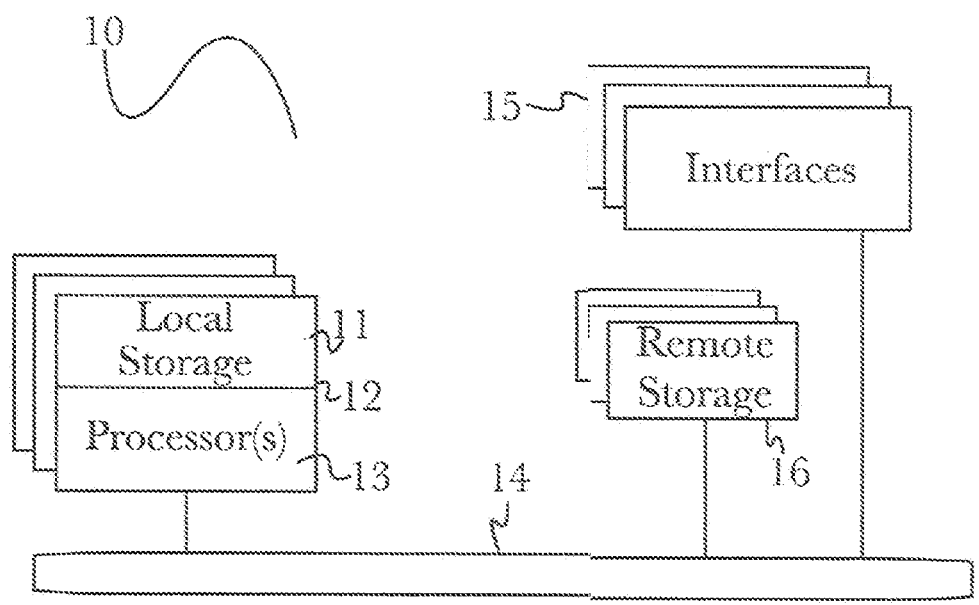
FIG. 5 is a block diagram illustrating an exemplary hardware architecture of a computing device, according to a preferred embodiment of the invention.

Referring now to FIG. 5, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random-access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 5 illustrates one specific architecture for a computing device 10 for implementing one or more of the embodiments described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, single processor 13 handles communications as well as routing computations, while in other embodiments a separate dedicated communications processor may be provided. In various embodiments, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 6:
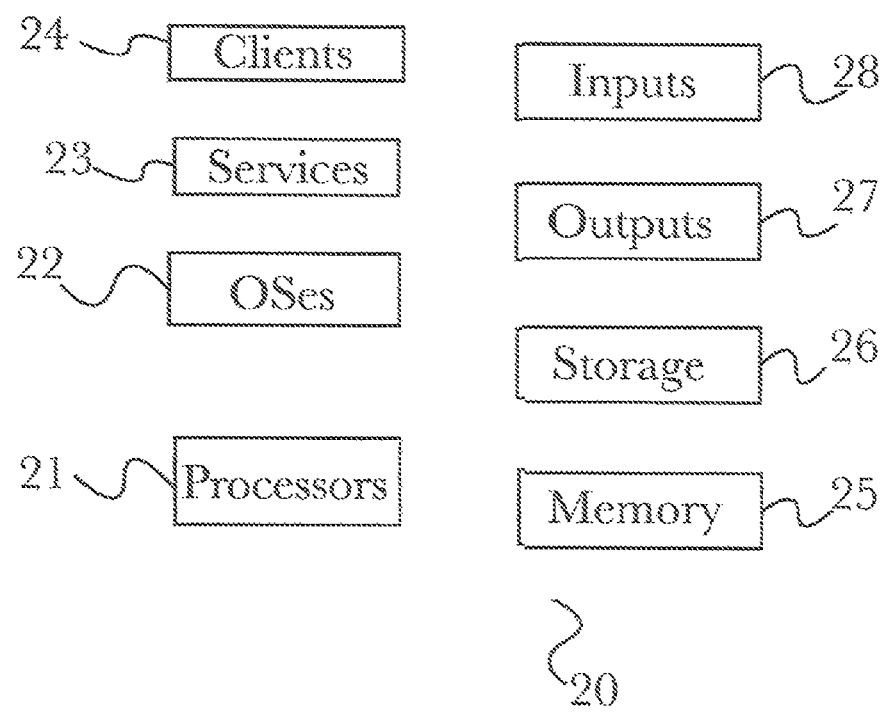
FIG. 6 is a block diagram illustrating an exemplary logical architecture for a client device, according to a preferred embodiment of the invention.

In some embodiments, systems may be implemented on a standalone computing system. Referring now to FIG. 6, there is shown a block diagram depicting a typical exemplary architecture of one or more embodiments or components thereof on a standalone computing system. Computing device 20 includes processors 21 that may run software that carry out one or more functions or applications of embodiments, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 5). Examples of storage devices 26 include flash memory, magnetic hard drive, CD-ROM, and/or the like.

Figure 7:
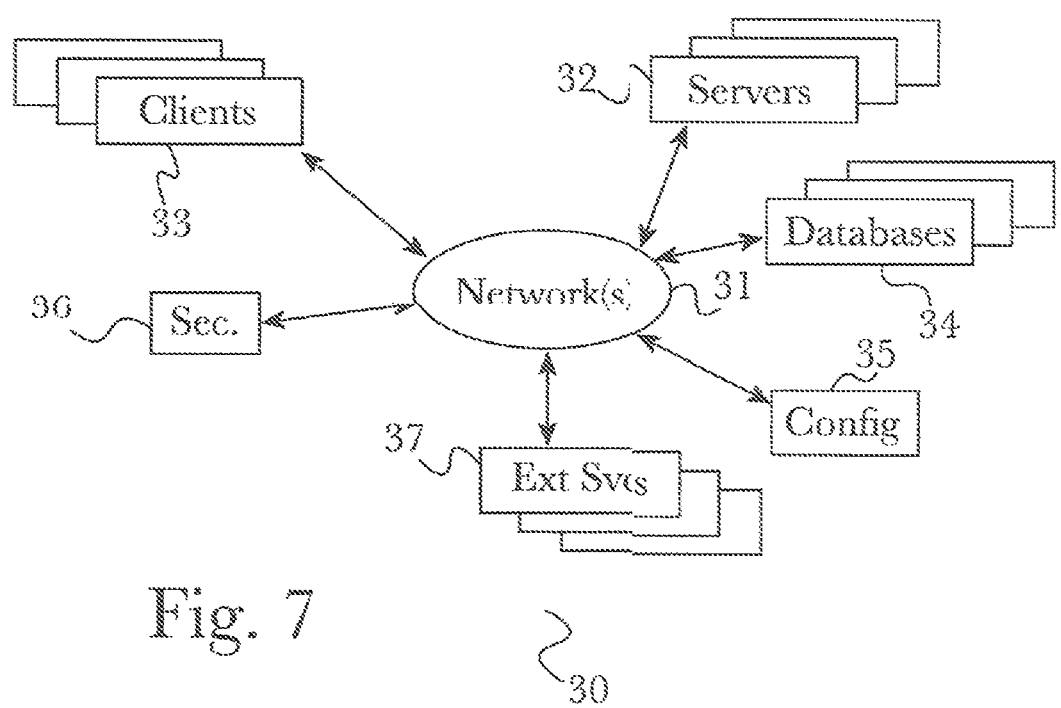
FIG. 7 is a block diagram showing an exemplary architectural arrangement of clients, servers, and external services, according to a preferred embodiment of the invention.

In some embodiments, systems may be implemented on a distributed computing network, such as one having any number of clients and/or servers. Referring now to FIG. 7, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 6. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises.

In some embodiments, clients 33 or servers 32 (or both) may make use of one or more specialized services or appliances that may be deployed locally or remotely across one or more networks 31. For example, one or more databases 34 may be used or referred to by one or more embodiments. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some embodiments may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments without limitation, unless a specific security 36 or configuration system 35 or approach is specifically required by the description of any specific aspect.

Figure 8:
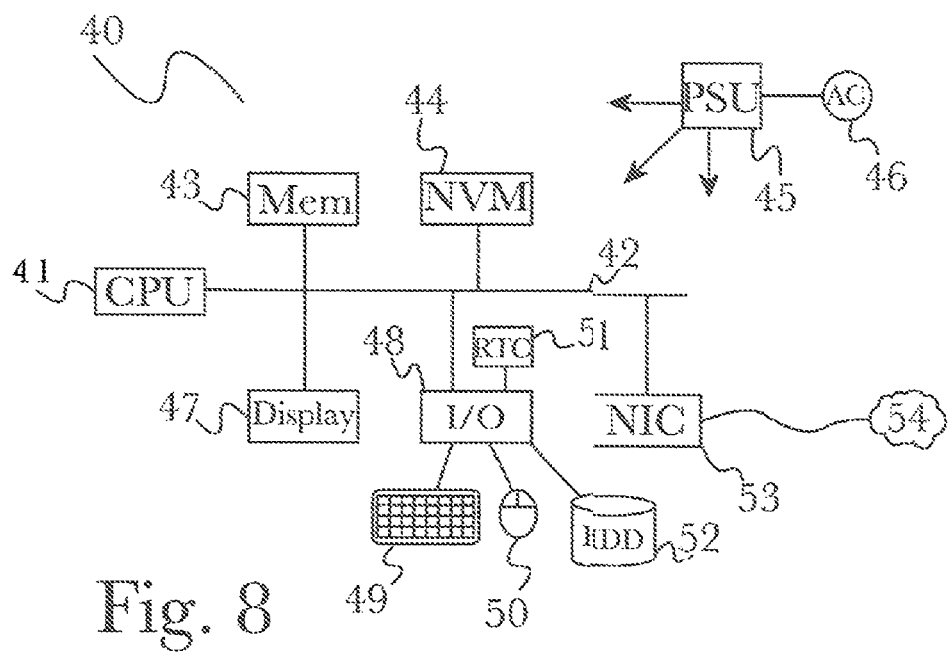
FIG. 8 is a block diagram showing an exemplary computing system, in accordance with an embodiment of the invention.

FIG. 8 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of various embodiments may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various embodiments described above. Accordingly, the present invention is defined by the claims and their equivalents Having fully described the computing system 100 (FIG. 1), analysis system 102 (FIG. 2), and general method 300 (FIG. 3) for collecting and process data collected from the system, it can be appreciated that the scanning station and its operating systems may be used for a wide variety of additional applications. For example, referring to FIG. 9, an exemplar package verification, tracking and data recording system 900 is shown.

In step 902, a package travels along a continuous flow conveyor 414 (FIG. 4B) into the package scanning region 412 (FIGS. 4A & 4B) of the scanning station 400 (FIGS. 4A & 4B) to trigger an interrupt notification. In step 904, the computer system detects the presence of the package (Step 902) and activates the enabling components in the scanner station such as the one or more two dimensional cameras (Step 906), the three dimensional camera (Optional, Step 908) and bar code scanner. If desired, weight information of the package can also be obtained by the computer system at or near the package scanning region.

As best shown in FIG. 2, the combined acquired images are synthesizes for further analysis. In one embodiment, two-dimensional data is analyzed for label detection, and the label position may be transposed to the three-dimensional data that is aligned (in, for example, a 1:1 fashion). Any number of digital data analysis systems and/or models may be applied to make this determination, as would be readily apparent to a person of ordinary skill in the art, without departing from the scope of the invention. For example, the package's major axis, minor axis, and/or a flatness measure to determine a property of the package. Alternatively and in addition to, an AI classification approach may be used to determine a desired property of the package. As would be readily understood by a person of ordinary skill in the art, the AI classifier may be trained using data from known types of packages. The classification model generated by the AI classifier may be created by using a variety of different mathematical systems and processes.

Referring back to FIG. 9, the system then uses the collected image data and/or the generated three-dimensional point cloud of the package to determine one or more properties of the package for further processing in a wide variety of possible processing pipelines. Exemplar pipelines can include a barcode detecting pipeline (step 914), a geometry measurement pipeline (step 912), a package type, single/multiple classifier pipeline (step 915), and a label detection pipeline (910). Each of these pipelines are discussed in greater detail below.

In step 914, the barcode detecting pipeline uses the machine-readable label/tag detection monitor 202 (FIG. 2) of the analysis system 102 (FIG. 1) to read the machine-readable tab/label associated with each package. The tag is preferably read by machine-readable tag/label reader 1222 (FIG. 12) within the scanning station 1000 (FIG. 10). The computer system 100 (FIG. 1) electronically associates and stores that information along with other relevant data such as date and time the package entered the scanner station and updates a database 928 (FIG. 9) with this information about the package.

In step 912, the geometry measurement pipeline may include the package size monitor 210 (FIG. 2) of the analysis system 102 (FIG. 2). As previously discussed, these monitors and engines can process the collected image data and/or three-dimensional point cloud of the package to determine one or more properties of the package such as its dimensions and the like. The computer system 100 (FIG. 1) electronically associates the determined properties with the package and stores that information along with other relevant data such as date and time the package entered the scanner station and updates a database 928 (FIG. 9) with this information about the package. Maintaining a database of the dimensions of each package as they pass through the system allows the system to be used to document and recall the condition of each package as it passes through the system.

In step 915, the package type, single/multiple classifier pipeline may include the package grouping detection monitor 204 (FIG. 2), the package type detection engine 206 (FIG. 2), and/or the package size monitor 210 (FIG. 2) of the analysis system 102 (FIG. 2). As previously discussed, these monitors and engines can process the collected image data and/or three-dimensional point cloud of the package to determine one or more properties of the package such as its dimensions, shape, package type and the like. The computer system 100 (FIG. 1) electronically associates the determined properties with the package and stores that information along with other relevant data such as date and time the package entered the scanner station and updates a database 928 (FIG. 9) with this information about the package.

Alternatively and/or additionally, in step 910, the label detection pipeline may include the package label position monitor 214 (FIG. 2) of the analysis system 102 to determine areas on the package that already contain labels or tags and electronically track those locations for future reference so that any downstream second label application or the like will not overlap these areas. For example, the computer system can identify and track areas on a package as "keep out" zones where additional labels or the like may not be placed, and remaining areas on the package as "free zones" where additional labels or the like may be applied.

After the respective pipelines have determined the at least one property of the package relevant determining a desired aspect of the package or system, the computer system 100 (FIG. 1) applies a pipeline sync/verification/documentation step to the process (Step 916). For example, the computer system can process the collected information and apply predetermined criteria to perform desired steps such as detecting discrepancies like multiple or overlapping packages in the scanner at the same time, a crushed package, an over or under weight package, and/or a discrepancy determining a desired physical property of the package. Preferably, an AI/feature-based classification approach is used to determine a desired property of the package. As would be readily understood by a person of ordinary skill in the art, the AI classifier may be trained using data from known types of packages. The classification model generated by the AI classifier may be created by using a variety of different mathematical systems and processes.

To perform these the computer system may have access to a database (Step 928) of information regarding the package which may include its earlier recorded physical properties, date, time, location of last scan, at the like.

If desired, the computer system can apply a label or the like to the package in an area on the package that the system has determined is within a "free zone" (Step 918). The computer system can also update the database (Step 928) with the newly collected and compiled information and transmit using a remote interface (step 916) the collected information externally (Step 930), preferably in a standard format for external consumers such as an IoT protocol like MQTT or the like.

In step 920, the computer system can also activate an operator interface to alert a worker of a detected discrepancy (Step 924), and/or allow an operator to pull-up collected information on a particular package (Step 922).

This system may be used in real-time to detect and correct discrepancies with the processing of a package through the system, and if desired, it can also store the collected package information for future reference. For example, the stored database can be consulted to document that a particular package was undamaged while under the operator's control.

Additional Considerations

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for creating an interactive message through the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. A computing system, comprising:
   a plurality of cameras configured to capture two-dimensional (2D) data in a package conveyance system, individual cameras being arranged at different positions with respect to markers within the package conveyance system;
   a plurality of depth detection cameras configured to capture depth data in the package conveyance system, individual depth detection cameras being arranged at different positions with respect to the markers, the 2D data and the depth data captured substantially simultaneously;
   at least one computing processor; and
   memory including instructions that, when executed by the at least one computing processor, enable the computing system to:
      obtain an interrupt notification, the interrupt notification indicating that an item is positioned within a detection region of an interrupt sensor;
      obtain 2D data from a 2D camera, the 2D data including a representation of the item;
      obtain 3D data from a depth detection camera, the 3D data including depth data associated with the item;
      transform the 2D data and 3D data to a reference 3D coordinate space based on positions of the plurality of cameras and positions of the plurality of depth detection cameras to associate 3D coordinates with geometric features represented in the 2D data relative to the reference 3D coordinate space; and
      determine item properties associated with the item based on the geometric features.

2. The computing system of claim 1, wherein the instructions when executed by the at least one computing processor further enable the computing system to:
   evaluate the 3D data with a feature classifier to determine the geometric features.

3. The computing system of claim 1, wherein the instructions when executed by the at least one computing processor to determine the item properties further enable the computing system to:
   analyze the geometric features and associated 3D coordinates; and
   determine at least one of a shape of the item, dimensions of the item, a major axes of the item, a minor axes of the item, or a flatness measure of at least one side of the item.

4. The computing system of claim 1, wherein the instructions when executed by the at least one computing processor further enable the computing system to:
   evaluate the 2D data with an artificial intelligence classifier to identify a label represented in the 2D data.

5. The computing system of claim 4, wherein the label is associated with the 3D coordinates.

6. The computing system of claim 5, wherein the instructions when executed by the at least one computing processor further enable the computing system to:

use the 3D coordinates associated with the label to define a zone within the 3D data, the zone specifying a restricted area for at least one of a label or marking.

7. The computing system of claim 1, wherein the instructions when executed by the at least one computing processor further enable the computing system to:
use a lookup table and the geometric features to determine attributes associated with the item.

8. The computing system of claim 7, wherein the attributes specify one of a type of item, a size of the item, or a shape of the item.

9. The computing system of claim 1, wherein the instructions when executed by the at least one computing processor further enable the computing system to:
evaluate an artificial intelligence classifier on the 2D data to identify a group of items represented in the 2D data; and
analyze geometric features associated with the group of items to determine whether items overlap a threshold amount.

10. The computing system of claim 1, wherein the instructions when executed by the at least one computing processor further enable the computing system to:
obtain a signal from a machine-readable tag sensor, the signal indicating whether a machine-readable tag associated with the item is identified within a package scanning region;
synchronize data obtained from the signal with a data store, the data specifying timestamp information indicating a time the item is within the package scanning region; and
generate one of feedback data or system level data from data in the data store, the feedback data providing an indication of a level of efficiency of the package conveyance system, the system level data specifying at least throughput of the package conveyance system or an error rate of the package conveyance system.

11. A computer-implemented method, comprising:
obtaining an interrupt notification, the interrupt notification indicating that an item is positioned within a detection region of an interrupt sensor;
obtaining two-dimensional (2D) data from a 2D camera of a plurality of cameras configured to capture 2D data in a package conveyance system, individual cameras being arranged at different positions with respect to markers within the package conveyance system, the 2D data including a representation of the item;
obtaining three-dimensional (3D) data from a depth detection camera of a plurality of depth detection cameras configured to capture depth data in the package conveyance system, individual depth detection cameras being arranged at different positions with respect to the markers, the 2D data and the depth data captured substantially simultaneously, the 3D data including depth data associated with the item;
transforming the 2D data and 3D data to a reference 3D coordinate space based on positions of the plurality of cameras and positions of the plurality of depth detection cameras to associate 3D coordinates with geometric features represented in the 2D data relative to the reference 3D coordinate space; and
determining item properties associated with the item based on the geometric features.

12. The computer-implemented method of claim 11, further comprising:
analyzing the geometric features and associated 3D coordinates; and
determining at least one of a shape of the item, dimensions of the item, a major axes of the item, a minor axes of the item, or a flatness measure of at least one side of the item.

13. The computer-implemented method of claim 11, further comprising:
evaluating the 2D data with an artificial intelligence classifier to identify a label represented in the 2D data, wherein the label is associated with the 3D coordinates.

14. The computer-implemented method of claim 13, further comprising:
using the 3D coordinates associated with the label to define a zone within the 3D data, the zone specifying a restricted area for at least one of a label or marking.

15. The computer-implemented method of claim 11, further comprising:
using a lookup table and the geometric features to determine attributes associated with the item, wherein the attributes specify one of a type of item, a size of the item, or a shape of the item.

16. The computer-implemented method of claim 11, further comprising:
obtaining a signal from a machine-readable tag sensor, the signal indicating whether a machine-readable tag associated with the item is identified within a package scanning region;
synchronizing data obtained from the signal with a data store, the data specifying timestamp information indicating a time the item is within the package scanning region; and
generating one of feedback data or system level data from data in the data store, the feedback data providing an indication of a level of efficiency of the package conveyance system, the system level data specifying at least throughput of the package conveyance system or an error rate of the package conveyance system.

17. A non-transitory computer readable storage medium storing one or more sequences of instructions executable by one or more processors to perform a set of operations comprising:
obtaining an interrupt notification, the interrupt notification indicating that an item is positioned within a detection region of an interrupt sensor;
obtaining two-dimensional (2D) data from a 2D camera of a plurality of cameras configured to capture 2D data in a package conveyance system, individual cameras being arranged at different positions with respect to markers within the package conveyance system, the 2D data including a representation of the item;
obtaining three-dimensional (3D) data from a depth detection camera of a plurality of depth detection cameras configured to capture depth data in the package conveyance system, individual depth detection cameras being arranged at different positions with respect to the markers, the 2D data and the depth data captured substantially simultaneously, the 3D data including depth data associated with the item;
transforming the 2D data and 3D data to a reference 3D coordinate space based on positions of the plurality of cameras and positions of the plurality of depth detection cameras to associate 3D coordinates with geometric features represented in the 2D data relative to the reference 3D coordinate space; and
determining item properties associated with the item based on the geometric features.

18. The non-transitory computer readable storage medium of claim 17, further comprising instructions executed by the one or more processors to perform the operations of:
- analyzing the geometric features and associated 3D coordinates; and
- determining at least one of a shape of the item, dimensions of the item, a major axes of the item, a minor axes of the item, or a flatness measure of at least one side of the item.

19. The non-transitory computer readable storage medium of claim 17, further comprising instructions executed by the one or more processors to perform the operations of:
- evaluating the 2D data with an artificial intelligence classifier to identify a label represented in the 2D data, wherein the label is associated with the 3D coordinates; and
- using the 3D coordinates associated with the label to define a zone within the 3D data, the zone specifying a restricted area for at least one of a label or marking.

20. The non-transitory computer readable storage medium of claim 17, further comprising instructions executed by the one or more processors to perform the operations of:
- obtaining a signal from a machine-readable tag sensor, the signal indicating whether a machine-readable tag associated with the item is identified within a package scanning region;
- synchronizing data obtained from the signal with a data store, the data specifying timestamp information indicating a time the item is within the package scanning region; and
- generating one of feedback data or system level data from data in the data store, the feedback data providing an indication of a level of efficiency of the package conveyance system, the system level data specifying at least throughput of the package conveyance system or an error rate of the package conveyance system.

* * * * *